United States Patent
Wulf

(10) Patent No.: US 10,023,187 B2
(45) Date of Patent: Jul. 17, 2018

(54) METHOD FOR OPERATING AN AUTONOMOUS DRIVING SAFETY OR DRIVER ASSISTANCE SYSTEM OF A MOTOR VEHICLE

(71) Applicant: WABCO GmbH, Hannover (DE)

(72) Inventor: Oliver Wulf, Neustadt (DE)

(73) Assignee: WABCO GmbH, Hannover (DE)

( * ) Notice: Subject to any disclaimer, the term of this patent is extended or adjusted under 35 U.S.C. 154(b) by 29 days.

(21) Appl. No.: 15/127,443

(22) PCT Filed: Mar. 10, 2015

(86) PCT No.: PCT/EP2015/000542
§ 371 (c)(1),
(2) Date: Sep. 20, 2016

(87) PCT Pub. No.: WO2015/139826
PCT Pub. Date: Sep. 24, 2015

(65) Prior Publication Data
US 2017/0129487 A1    May 11, 2017

(30) Foreign Application Priority Data
Mar. 21, 2014   (DE) .................. 10 2014 004 110

(51) Int. Cl.
*B60W 30/09* (2012.01)
*G05D 1/00* (2006.01)
(Continued)

(52) U.S. Cl.
CPC ............... *B60W 30/09* (2013.01); *B60T 7/22* (2013.01); *G01C 21/3697* (2013.01);
(Continued)

(58) Field of Classification Search
CPC ............ B60W 30/09; B60W 2550/10; B60W 2550/146; B60W 2550/30; B60T 7/22; G01C 21/3697; G05D 1/0088
See application file for complete search history.

(56) References Cited

U.S. PATENT DOCUMENTS

2004/0193374 A1   9/2004  Hac et al.
2007/0299610 A1   12/2007  Ewerhart et al.
(Continued)

FOREIGN PATENT DOCUMENTS

DE   102004052127 A1   5/2006
DE   102011086530 A1   5/2012
(Continued)

*Primary Examiner* — Aaron L Troost
(74) *Attorney, Agent, or Firm* — Leydig, Voit & Mayer, Ltd.

(57) ABSTRACT

A method includes continuously recording, by the autonomous driving safety or driver assistance system, at least one of vehicle-related data and vehicle surroundings-related data, continuously repeatedly deciding, based on the recorded data, whether a driving safety or driver assistance system process is to be autonomously initiated or carried out, and carrying out a checking process, during which sensor data and parameter settings that are necessary for the operation of the driving safety or driver assistance system are checked for the plausibility thereof. The checking process is carried out immediately following a start of travel of the motor vehicle. In a period of time between the start of travel of the motor vehicle and a start of operation of the driving safety or driver assistance system, an auxiliary process for an immediate and safe auxiliary mode of the driving safety or driver assistance system is used during a checking period.

16 Claims, 2 Drawing Sheets

(51) Int. Cl.
  *B60T 7/22* (2006.01)
  *G01C 21/36* (2006.01)
(52) U.S. Cl.
  CPC ....... *G05D 1/0088* (2013.01); *B60W 2550/10* (2013.01); *B60W 2550/146* (2013.01); *B60W 2550/30* (2013.01)

(56) References Cited

U.S. PATENT DOCUMENTS

| | | |
|---|---|---|
| 2009/0319118 A1 | 12/2009 | Knechtges |
| 2010/0007728 A1 | 1/2010 | Strauss et al. |
| 2013/0268798 A1 | 10/2013 | Schade et al. |
| 2013/0332030 A1* | 12/2013 | Koukes ................. B60T 8/171 701/41 |
| 2015/0066412 A1* | 3/2015 | Nordbruch ............. G07C 5/008 702/104 |

FOREIGN PATENT DOCUMENTS

| | | |
|---|---|---|
| DE | 102011087063 A1 | 9/2012 |
| DE | 102012203209 A1 | 9/2012 |
| EP | 1934075 B1 | 6/2008 |

\* cited by examiner

METHOD FOR OPERATING AN AUTONOMOUS DRIVING SAFETY OR DRIVER ASSISTANCE SYSTEM OF A MOTOR VEHICLE

CROSS REFERENCE TO RELATED APPLICATIONS

This application is a U.S. National Stage Application under 35 U.S.C. § 371 of International Application No. PCT/EP2015/000542 filed on Mar. 10, 2015, and claims benefit to German Patent Application No. DE 10 2014 004 110.7 filed on Mar. 21, 2014. The International Application was published in German on Sep. 24, 2015 as WO 2015/139826 A1 under PCT Article 21(2).

FIELD

The invention relates to a method for operating an autonomously operating driving safety or driver assistance system of a motor vehicle.

BACKGROUND

Autonomously operating driving safety or driver assistance systems for motor vehicles are known in different implementations. Such systems comprise sensors that record at least the area in front of the vehicle in the direction of travel by sensors, and the data thereof are analyzed in a computer by means of suitable software. Based on the information obtained by said data processing, the computer can automatically trigger and carry out the regulation of braking, speed, distance, compensation and/or deviation by means of corresponding control devices and actuators.

Prompted by EC Regulation No. 661/2009, emergency brake systems known as AEBSs (Advanced Emergency Braking Systems) are increasingly being used in commercial vehicles; said systems output visual and/or audible signals where certain brake-related sensor data are present and if necessary initiate and regulate autonomous emergency braking with a maximum possible deceleration of the vehicle in order to avoid a collision with a vehicle that is traveling or that has stopped in the area in front of the vehicle or with a stationary obstacle, or at least to reduce the consequences of an impending collision.

In such an emergency brake system, such as for example the known emergency brake system OnGuardPLUS® of the applicant, for safety reasons a checking process should initially be carried out each time following the switch-on of the engine ignition, during which the sensor data and parameter settings that are necessary for the operation of the driving safety or driver assistance system are checked for the plausibility thereof. As a result, there is a conflict between the required complete functional safety and the immediate availability of the emergency brake system, since the driving safety or driver assistance system is only operationally ready and is only released as being functionally safe following the completion of the checking process. During the first kilometers or minutes of driving after the start, i.e. during the checking process, such a driving safety or driver assistance system is therefore deactivated. This can be indicated to the driver by a yellow warning light. Such a warning light indicator is obligatory for an inactive emergency brake system, at least in the commercial vehicle field. However, this is potentially perceived by a driver of a motor vehicle as disturbing or irritating. Moreover, the driving safety or driver assistance system is only available with a time delay after the commencement of travel.

An electronic driving dynamics regulating system of a land vehicle for steering and braking intervention, with which a yaw rate and/or a lateral acceleration of the subject vehicle is/are detected by means of a sensor arrangement, is known from EP 1 934 075 B1. Said data are checked for the plausibility thereof within a period of time that is shorter than half a second, and said data are then incorporated as actual variables in a calculation of driving dynamics target values of the driving dynamics regulating system. During the plausibility check of the signals, the brake forces of a brake system and/or the steering forces of a steering device of the vehicle are each limited to a level that is assessed as being non-critical for the safety of the vehicle.

SUMMARY

In an embodiment, the present invention provides a method for operating an autonomous driving safety or driver assistance system of a motor vehicle. The method includes continuously recording, by the autonomous driving safety or driver assistance system, at least one of vehicle-related data and vehicle surroundings-related data, continuously repeatedly deciding, based on the recorded data, whether a driving safety or driver assistance system process is to be autonomously initiated or carried out, and carrying out a checking process, during which sensor data and parameter settings that are necessary for the operation of the driving safety or driver assistance system are checked for the plausibility thereof. The checking process is carried out immediately following a start of travel of the motor vehicle. In a period of time between the start of travel of the motor vehicle and a start of operation of the driving safety or driver assistance system, an auxiliary process for an immediate and safe auxiliary mode of the driving safety or driver assistance system having reduced functional scope is used during a checking period.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
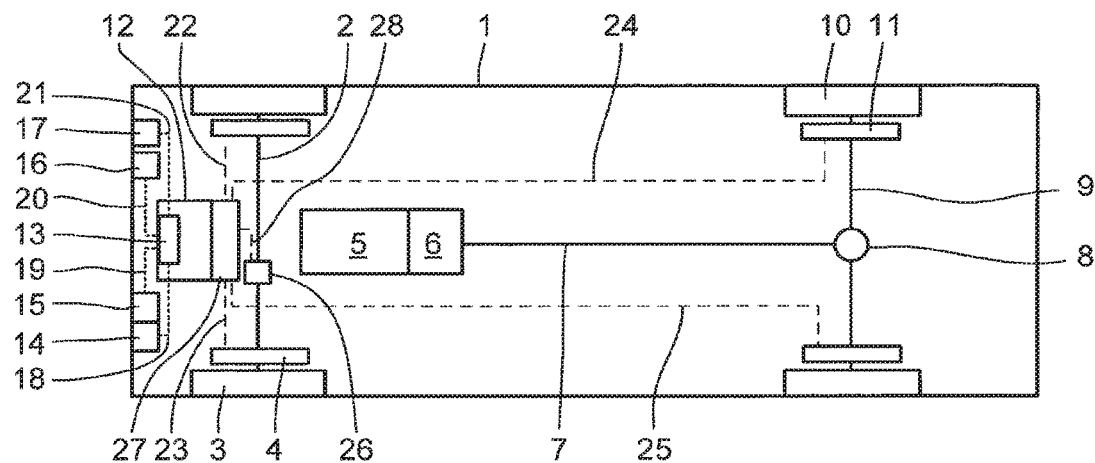
FIG. 1 is a schematic representation of a motor vehicle fitted with a driving safety or driver assistance system capable of being operated pursuant to a method according to an embodiment of the invention.

Embodiments of the invention specify methods for operating an autonomous driving safety or driver assistance system of a motor vehicle, with which the conflict between functional safety and availability is reduced, and which is still comfortable in operation.

Embodiments of the invention allow for an autonomous driving safety or driver assistance system of a motor vehicle to be initially operated in a so-called auxiliary mode following the start of travel with a conservatively specified set of parameters until a plausibility check of all relevant sensor data and parameter settings, which is necessary to enable a normal mode with the possibility of extreme vehicle deceleration or evasive response, is completed.

An embodiment of the invention provides a method for operating an autonomous driving safety or driver assistance system of a motor vehicle that continuously records vehicle-related and/or vehicle surroundings-related data, which continuously repeatedly makes a decision about whether a driving safety or driver assistance system process is to be initiated or performed autonomously based on said data, and which performs a checking process in which sensor data and parameter settings that are necessary for the operation of the driving safety or driver assistance system are checked for the plausibility thereof. An embodiment of the invention provides that the checking process is performed immediately after the start of travel of the motor vehicle, wherein an auxiliary method for an immediate and safe auxiliary mode of the driving safety or driver assistance system with slightly reduced functional scope is used during a checking period in the period between the start of travel of the motor vehicle and the start of the normal operation of the driving safety or driver assistance system. Said functional scope is selected such that the driver does not have to be given any indication that the driving safety or driver assistance system is operating in a slightly restricted manner.

A distinction is made below between a primary method or a normal method for a primary mode or a normal mode and an auxiliary method for an auxiliary mode of an autonomous driving safety or driver assistance system. A mode of the driving safety or driver assistance system means the primary or normal mode. The driving safety or driver assistance system initially operates in the auxiliary mode after a starting phase and then in the primary mode or normal mode.

A driving safety or driver assistance system according to an embodiment of the invention can for example operate as an autonomous emergency brake system (AEBS), as a distance and speed regulating system and/or as a steering intervention system. The following description essentially refers to an autonomous emergency brake system. An auxiliary method for an immediate and safe auxiliary mode according to an embodiment of the invention can in principle also be used for other driving safety or driver assistance systems than the emergency brake system that is described below.

An embodiment of the invention provides an auxiliary mode for a driving safety or driver assistance system with reduced input sensitivity. In said operating mode, a checking period, which starts immediately following the engine being started or the start of travel, can be bridged without the driving safety or driver assistance system having to be deactivated. Consequently, the necessary plausibility tests can be carried out during the auxiliary mode without a yellow warning lamp or a notification signaled to the driver in another way necessarily being activated.

In a checking period, the required sensor data and parameter settings that are necessary for normal operation of the driving safety or driver assistance system are checked for the plausibility thereof. Following a readiness feedback message for all the checked sensors or sensor data and settings as well as the subsequent successful completion of the checking process, the driving safety or driver assistance system is released for normal operation.

The initial auxiliary mode of the driving safety or driver assistance system is not noticed by the driver. Rather, the driver can assume that the driving safety or driver assistance system is operationally ready immediately following the switch-on of the engine ignition. The operational readiness being initially slightly limited regarding the functional scope thereof does not have an adverse effect on the driver. As a result, on the one hand the legal regulations for such safety-relevant systems are met, on the other hand the operating and ride comfort of the vehicle are not adversely affected. In particular, with the start of travel an immediate and safe auxiliary mode of the driving safety or driver assistance system is made available.

The immediate auxiliary mode is enabled by an auxiliary method that uses a reduced or simplified set of parameters. The auxiliary method operates with a lower input sensitivity than the method in the normal mode. Therefore, the auxiliary method uses a lower number, a limited range and/or a coarser grade of vehicle-related and/or vehicle surroundings-related data. Consequently, owing to certain simplified assumptions, the auxiliary method also responds less sensitively to initial errors that have not yet been recognized, which can occur for example owing to less optimal sensor orientations, relatively high signal fluctuations, relatively high signal offsets or inaccurate speed signals etc.

Owing to the not yet completed safety checks and plausibility checks on the data, it is useful in the auxiliary mode to reduce any intervention of the driving safety or driver assistance system to a non-critical level. Accordingly, it can be provided that during the auxiliary mode of a driving safety or driver assistance system acting as an emergency brake system, a limit value for a maximum effective brake force of a brake system of the motor vehicle that can be activated by the emergency brake system is reduced.

At this point it should be mentioned that it is possible in principle, if the primary method should fail when driving, to use the auxiliary method at least temporarily at any time.

With a preferred embodiment of a method for operating a driving safety or driver assistance system of a motor vehicle that is operating as an autonomous emergency brake system, it can be provided that drive-related data of the motor vehicle, route-related, traffic-related and/or environment-related data as well as data for assessing the driving activities of the driver of the motor vehicle are continuously recorded, that the position, the speed and the acceleration of at least one motor vehicle ahead and/or the position of at least one stationary obstruction are recorded continuously, and that based on the recorded data a decision is continuously repeatedly made as to whether an emergency braking process that will prevent a collision of the motor vehicle with at least one vehicle ahead and/or a stationary obstacle ahead or at least reduce the consequences of such a collision is to be autonomously initiated or carried out, wherein the auxiliary method for the auxiliary mode of the driving safety or driver assistance system uses previously determined assumptions and/or immediately available data about the operating state of the motor vehicle, about the geometry of the current route, about a current range of driving speeds of the motor vehicle, about the current traffic situation as well as about the current driving activities of the driver, wherein during the course of the auxiliary process the sensor data and parameter settings that are necessary for the operation of the method are checked for the plausibility thereof, and wherein during the course of the auxiliary process a start scenario with the initial sensor data and initial parameter settings for the start of the operation of the driving safety or driver assistance system with non-reduced functional scope is generated from plausible sensor data and parameter settings.

Therefore, a sensor system that is present in the vehicle records relevant data of the subject vehicle as well as of the surroundings thereof and assesses said data together with the operating data of the subject vehicle by means of a device for electronic data processing, in which a suitable processing algorithm is stored. The environment sensor system can comprise radar, lidar, video and/or other known measuring systems that are suitable for the measurement of distance, position and/or speed. Relevant operating data of the subject vehicle are generally available anyway by means of a data bus of an on-board data network system of the vehicle that is generally provided in modern vehicles.

If an impending collision with a motor vehicle ahead or a stationary obstacle is detected by the data analysis, the emergency brake system can autonomously initiate an emergency braking process with a maximum possible brake force or a maximum possible deceleration of the subject vehicle in order to prevent the collision or at least to reduce the speed of the vehicle to the extent that the consequences of a collision are kept as low as possible.

If the emergency brake system is still in the described checking phase following the start of travel, the auxiliary method for the auxiliary mode of the driving safety or driver assistance system is active instead of the primary or normal method. For the auxiliary method, simplified assumptions that are specified in advance are used as well as immediately available sensor data and parameter settings, for example from previous journeys, which enable an immediate auxiliary mode whilst the sensor data and parameter settings that are necessary for the normal mode are checked for the plausibility thereof. The sensor data and parameter settings that have not yet been checked for the plausibility thereof are preferably changed and/or limited during the auxiliary mode so that any errors that exist and have not yet been detected do not result in unsafe operation of the driving safety or driver assistance system. From the verified sensor data and parameter settings, during the auxiliary mode a starting scenario with the initial sensor data and initial parameter settings for the start of the normal mode of the driving safety or driver assistance system is produced with non-reduced functional scope. Once all necessary sensor data and parameter settings are verified, the primary method is operationally ready, whereupon the auxiliary method can be terminated and also will be terminated.

According to another embodiment, the sensitivity of the auxiliary method can approach the sensitivity of the normal operating method by the previously determined data and parameters that are used during the operation of the auxiliary method being successively replaced and/or expanded by determined data and parameters that have been checked for the plausibility thereof. As a result, the auxiliary method is continuously refined following the start of travel.

Moreover, it can be provided that the checking period in which the checking process is carried out, during which the sensor data and parameter settings that are necessary for the operation of the driving safety or driver assistance system are checked for the plausibility thereof and in which the auxiliary method for the auxiliary mode of the driving safety or driver assistance system is used, is the period of time from the start of travel until the successful completion of all checking and plausibility checking activities. Said period of time is variable and depends on the type of plausibility check functions, the driving profile as well as the ambient conditions.

According to an alternative embodiment, it can be provided that the checking period in which the checking process is carried out, during which the sensor data and parameter settings that are necessary for the operation of the driving safety or driver assistance system are checked for the plausibility thereof and in which the auxiliary method for the auxiliary mode of the driving safety or driver assistance system is used, is a period of time in which the vehicle covers a route of a previously determined minimum length.

In order to check the necessary sensor data and parameter settings for the plausibility thereof, driving states determined by the subject vehicle are driven through, such as for example straight-ahead travel, turning and/or traveling at a certain minimum speed and others. It is therefore advantageous to not use a period of time but to use a certain route after the start of travel or after switching on the engine ignition as a basis for the length of the checking process.

The checking period can preferably be a period of time in which the subject vehicle covers a driving distance $s_{dis}$ of between 2 km and 15 km. It has been shown that after a driving distance of 10 km, all provided sensor data and parameter settings are usually checked for the plausibility thereof and a start scenario with the initial sensor data and initial parameter settings for the start of the operation of the driving safety or driver assistance system with non-reduced functional scope is generated from the plausible sensor data and parameter settings.

Some preferred assumptions for the operation of the auxiliary method are mentioned below, wherein the numbers or ranges of numbers mentioned by way of example have been found to be especially useful and advantageous for commercial vehicles. Said assumptions enable an immediate but still safe auxiliary mode of the driving safety or driver assistance system during said checking period. Further assumptions are possible in principle.

As a first assumption for the auxiliary method for the auxiliary mode of the driving safety or driver assistance system, an at least approximately turn-free route can be assumed. For example, a turn radius of $|r_{curve}|>1000$ m can be assumed for the route for the auxiliary method. Therefore, in the case of emergency braking for an autonomous emergency brake system in the auxiliary mode, a braking intervention would be determined that is configured for a traffic situation on a straight road. Reduced braking interventions are thus carried out in turns compared to in normal mode.

As a second assumption for the auxiliary method for the auxiliary mode of the driving safety or driver assistance system, a limited range of driving speeds can be assumed. For example, a range of driving speeds of 60 km/h<$v_{vehicle}$<90 km/h for the auxiliary method can be assumed. Therefore, in the case of emergency braking with an autonomous emergency brake system in the auxiliary mode, a braking intervention would be determined that is configured for a traffic situation within said range of speeds. In relatively slow urban traffic or relatively fast highway traffic, reduced braking interventions are thus carried out compared to normal mode.

As a third assumption for the auxiliary method for the auxiliary mode of the driving safety or driver assistance system, it can be assumed that a vehicle ahead is moving relative to the subject vehicle with a limited speed in the lateral direction relative to the primary direction of travel of the subject vehicle. For example, for the auxiliary method a relative lateral speed of a vehicle ahead of $|v_y|<0.5$ m/s can be assumed. A detected vehicle ahead that is moving in the lane of the subject vehicle therefore has no lateral speed that is relevant here. Said lateral speed arises if a vehicle ahead moves into or out of the same lane. Vehicles moving into or out of the lane of the subject vehicle are responded to with only a reduced braking intervention compared to normal mode.

As a fourth assumption for the auxiliary method for the auxiliary mode of the driving safety or driver assistance system, it can be assumed that a detected object is disposed within the surroundings of the vehicle for a minimum period of time. For example, for the auxiliary method a minimum period of time in which a detected object is disposed within the surroundings of the vehicle of $t_{obj}$>3 s can be assumed. Therefore, the auxiliary method assumes confirmed evidence of a relevant object, the so-called object lifetime, if said object is in the field of view of the sensor system of the subject vehicle for longer than 3 seconds. Said reduced input sensitivity therefore results in the filtering out of objects that enter the field of view of the sensor system late and then are very rapidly at a critical distance from the subject vehicle. As a result, erroneous controlling of the emergency brake system owing to sensors not yet being correctly oriented immediately after the start of travel can be avoided.

As a fifth assumption for the auxiliary method for the auxiliary mode of the driving safety or driver assistance system, stopped vehicles can be assumed to be stationary obstacles. Therefore, a distinction is only made between moving and stationary objects for the auxiliary method. For example, for simplicity a vehicle that is stopped at a traffic jam is assessed as a stationary obstacle. As a result, the negative consequences of a potential false classification that could occur owing to a faulty speed measurement for example are suppressed.

Moreover, outside of the checking periods in which the auxiliary method for the auxiliary mode of the driving safety or driver assistance system is used, it can be provided that the driving safety or driver assistance system is deactivated at driving speeds below a speed limit value or is activated on reaching and when above the speed limit value.

Therefore, a minimum speed can be specified for the start of the primary method. Because common ambient sensors, such as radar systems or speed measuring devices, often operate erroneously or are subject to high systematic errors at very low driving speeds owing to the measuring principle thereof, it is useful to deactivate the normal mode of the driving safety or driver assistance system at such low driving speeds. A speed limit value of $v_{vehicle\_lim}$=15 km/h, on falling below which the driving safety or driver assistance system is deactivated, has proved to be useful.

According to one exemplary embodiment, a method can be used for a driving safety or driver assistance system of a commercial vehicle that is in the form of an autonomous emergency brake system. In this case, the vehicle is fitted with a radar system, although a lidar system or a camera can also be used. Furthermore, the vehicle comprises a brake system that can be activated by the emergency brake system and that can be operated by means of actuators.

With the method, in a primary mode or normal mode of the emergency brake system, drive-related data of the commercial vehicle, route-related, traffic-related and/or environment-related data as well as data for assessing the driving activities of the driver of the commercial vehicle are continuously recorded based on an input set of sensor data and parameter settings. Furthermore, the position, the speed and the acceleration of at least one motor vehicle ahead and/or the position of at least one stationary obstacle are continuously recorded. The recorded data are stored in volatile and/or non-volatile memories of a computer and are subjected to a computing algorithm by means of software.

Based on the recorded and analyzed data, the emergency brake system or the control electronics thereof continuously and repeatedly make a decision about whether a collision of the subject vehicle with at least one vehicle ahead and/or a stationary obstacle ahead is impending, and whether an emergency braking process for preventing or at least reducing the consequences of such a collision is to be autonomously initiated or carried out.

Following each re-start of the vehicle, the method initially performs a checking process, with which the sensor data and parameter settings that are necessary for the operation of the emergency brake system are checked for the plausibility thereof. The vehicle is in said checking mode during the first approximately 10 km of the route. The primary or normal mode of the emergency brake system is not available during this time. Instead, an auxiliary method is carried out, which ensures an auxiliary mode of the emergency brake system with slightly reduced functional scope. The auxiliary mode of the emergency brake system is ready approximately immediately following the start of travel.

The auxiliary method for the auxiliary mode of the emergency brake system operates with previously determined assumptions, with parameters determined during the most recent journeys and/or with immediately available data about the operating state of the vehicle, about the geometry of the current route, about a current range of driving speeds of the vehicle, about the current traffic situation as well as about the current driving activities of the driver. With the determined assumptions, an input set of sensor data and parameter settings that is reduced compared to the primary method is produced, which enables the immediate auxiliary mode. The following table shows an exemplary set of parameters with reduced parameters:

| | |
|---|---|
| Route characteristic: | turn radius: $|r_{curve}|$ > 1000 m |
| Speed of travel: | range of speeds 60 km/h < $v_{vehicle}$ < 90 km/h |
| Vehicle entering lane: | lateral speed: $|v_y|$ < 0.5 m/s |
| Object detection: | object lifetime: $t_{obj}$ > 3 s |
| Object kinetics: | Stationary object: $v_{obj}$ = 0 m/s |

Using said assumptions, a cautious or conservative estimation is made for commercial vehicles that is sufficiently safe for an auxiliary mode of an emergency brake system, but that does not trigger any unnecessary autonomous emergency braking. The auxiliary method therefore enables full functionality of the emergency brake system for an essentially straight-ahead route profile, average driving speeds, vehicles joining the same lane rather gradually, vehicles ahead that are in the field of view for at least a few seconds, and stopped vehicles, which are assessed as a stationary obstacle. In all other traffic situations, the auxiliary method only carries out restricted or hardly any braking interventions.

The previously determined data and parameters used during the operation of the auxiliary process can be successively replaced and/or supplemented by determined, plausibility checked data and parameters.

In the case in which a braking intervention is recognized as necessary while the emergency brake system is in the auxiliary mode, a slightly attenuated braking intervention is carried out on the brake system compared to a maximum possible deceleration of the vehicle in the limiting case.

During the course of the auxiliary process, the sensor data and parameter settings that are necessary for the operation of the primary method are checked for the plausibility thereof. A start scenario with the initial sensor data and initial parameter settings for the start of the normal mode of the emergency brake system is produced from the plausible sensor data and parameter settings.

The driver does not notice the auxiliary method and the auxiliary mode, which precede the actual primary method and the primary mode, because the emergency brake system is already active with reduced input sensitivity during the first kilometer of driving. During the plausibility checks of the sensor data and parameter settings for actual operation, no possibly irritating warning messages of the emergency brake system are thus displayed to the driver. Rather, an immediate auxiliary mode of the autonomous emergency brake system is available to the vehicle or the driver immediately following the start of travel.

In an exemplary embodiment, the motor vehicle 1 schematically represented in FIG. 1 shall be a commercial vehicle comprising a steerable front axle 2 with front wheels 3 and a driven rear axle 9 with rear wheels 10. The motor vehicle 1 comprises an internal combustion engine 5, which drives the rear wheels 10 by means of a gearbox 6, a propeller shaft 7, a differential gearbox 8 and drive shafts of the rear axle 9. The vehicle wheels 3, 10 can be braked by means of respectively associated brake devices 4, 11 actuated by a pressure medium. The steering of the front wheels 3 is carried out by means of a steering wheel, which is not shown, for the driver of the vehicle as well as by means of a steering device 26 that is disposed on the front axle 2. In the illustrated exemplary embodiment, the steering device 26 is designed to be at least additionally hydraulically operated. Moreover, the motor vehicle 1 comprises a plurality of sensors 14, 15, 16, 17 that are connected to a driving safety or driver assistance system 12 by means of sensor lines 18, 19, 20, 21 that are illustrated as dotted lines. Said driving safety or driver assistance system 12 comprises at least one computer 13, which receives the signals of the sensors 14, 15, 16, 17 and analyses said signals according to data processing programs stored in the computer 13. As a result of said data processing, the computer 13 outputs control commands to an electrohydraulic or electropneumatic control unit 27, which is also part of the driving safety or driver assistance system 12 or at least can be activated by said system 12. Said control unit 27 switches hydraulic or pneumatic control pressures or working pressures through to the brake devices 4, 11 on the respective vehicle wheels 3, 11 by means of pressure medium lines 22, 23, 24, 25 as a result of received control commands, so that said brake devices can be actuated to brake the motor vehicle 1. If required, the control unit 27 of the driving safety or driver assistance system 12 can also subject the steering device 26 to a control or working pressure by means of a pressure medium line 28, as result of which a steering movement caused by the driver of the vehicle is assisted or overridden. The sensors 14, 15, 16, 17 that provide information to the computer 13 of the driving safety or driver assistance system 12 about the surroundings of the motor vehicle 1 as well as about the current traffic situation, can for example be sensors of a radar system, sensors of a lidar system, speed sensors, optical cameras and/or accelerometers.

Figure 2:
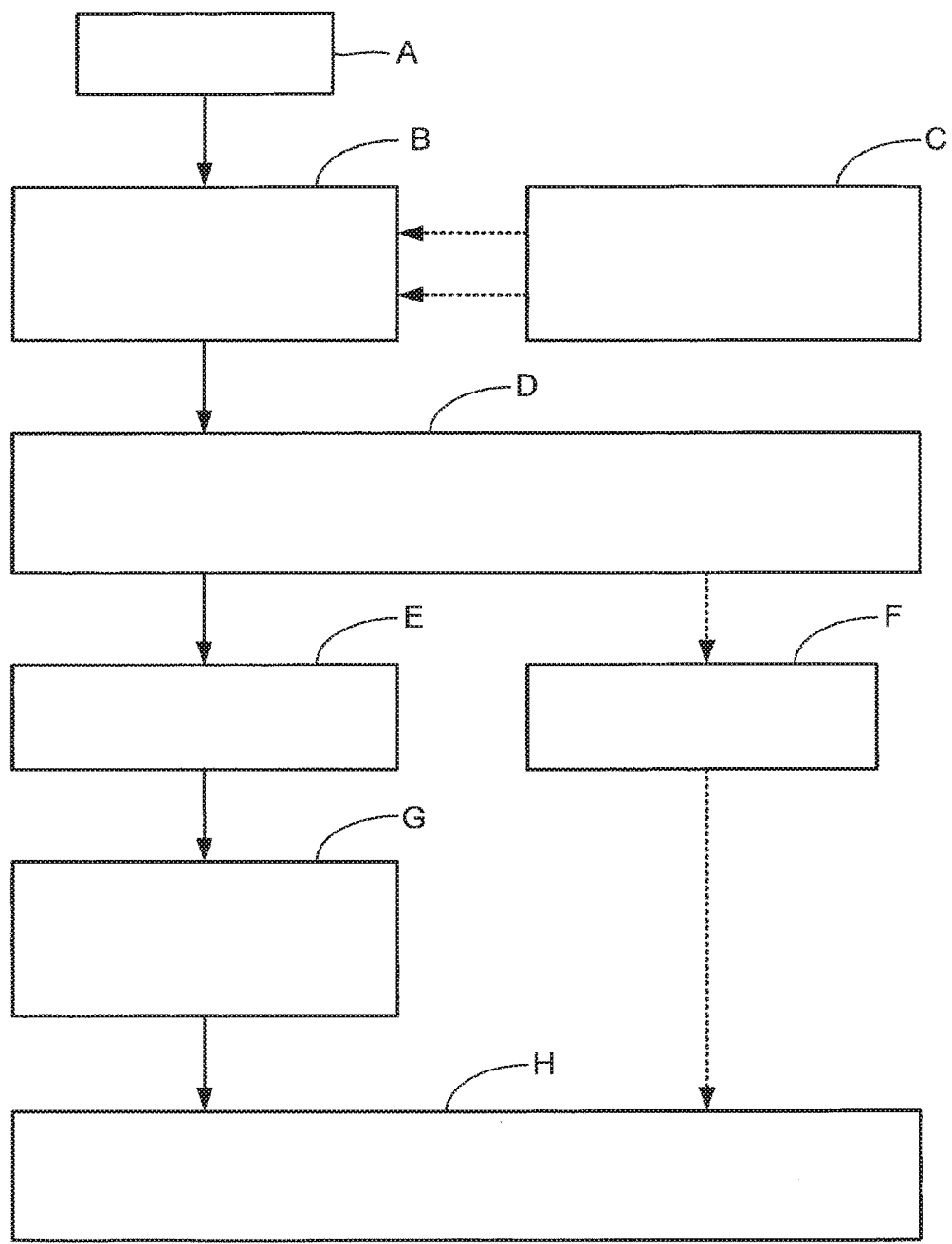
FIG. 2 is a flow chart of a method according to an embodiment of the invention.

For a comparatively coarse graphical illustration of the processes when using a method according to an embodiment of the invention, refer to FIG. 2 below. The flow chart shown there shows a plurality of primary process steps in the form of blocks A to H. Initially, in a first step A, a check is made as to whether the journey of the motor vehicle has started. If the start of travel has been determined, the driving safety or driver assistance system 12 is started with an auxiliary method (step B), which enables a mode of the driving safety or driver assistance system 12 with a reduced functional scope and/or a reduced input sensitivity compared to a normal mode. For the operation of the driving safety or driver assistance system 12 with the auxiliary method, provisional sensor data as well as provisional parameter settings are used (step C), which have been collected during previous journeys of the motor vehicle and/or which have been stored in the computer 13 of the driving safety or driver assistance system 12 by the manufacturer. Said provisional sensor data and provisional parameter settings are referred to as provisional since they are not yet or not yet sufficiently checked as suitable for an optimal normal mode of the driving safety or driver assistance system 12.

The motor vehicle 1 travels over a previously determined route of, for example, 10 km in length during the further time profile using said auxiliary method with restricted functional scope of the driving safety or driver assistance system 12 (step D). In said phase of operation (step D), the provisional sensor data and provisional parameter settings are checked regarding whether said sensor data are plausible and said parameter settings are suitable for the current operating situation of the motor vehicle. If the same are plausible and suitable, said parameter settings are stored as valid parameter settings in the control unit (step F) and they are used for the current and future driving operations.

Once it has been determined in step E that the previously determined route has been completely travelled by the motor vehicle, in step G the operation of the auxiliary process is terminated and a changeover to the normal mode of the driving safety or driver assistance system 12 is carried out (step H), which system then uses with the full functional scope thereof the current sensor data and the parameter settings that were previously determined to be valid. If it turns out that the length of the route travelled is not sufficient to check all the sensor data and parameter settings for the plausibility thereof, then the route and hence the necessary duration of the process for the auxiliary mode of the driving safety or driver assistance system can be extended if required.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating an autonomous driving safety system or driver assistance system of a motor vehicle, the method comprising:
    continuously recording data using the autonomous driving safety or driver assistance system, wherein the data include at least one of vehicle-related data and vehicle surroundings-related data,
    continuously repeatedly deciding, based on the recorded data, whether a driving safety or driver assistance system process is to be autonomously initiated or carried out, and
    carrying out a checking process, during which sensor data and parameter settings that are necessary for the operation of the driving safety or driver assistance system are checked for the plausibility thereof,
    wherein the checking process is carried out immediately following a start of travel of the motor vehicle,
    wherein in a period of time between the start of travel of the motor vehicle and a start of operation of the driving safety or driver assistance system, an auxiliary process for an immediate and safe auxiliary mode of the driving safety or driver assistance system having reduced functional scope is used,
    wherein the driving safety or driver assistance system acts at least as an emergency brake system, and
    wherein during the auxiliary mode of the driving safety or driver assistance system, a limit value for a maximum effective brake force of a brake system of the motor vehicle that is activated by the emergency brake system is reduced relative to a normal mode of the driving safety or driver assistance system.

2. The method as claimed in claim 1, wherein the driving safety or driver assistance system further acts as at least one of an autonomous distance and speed regulating system and an autonomous steering intervention system.

3. The method as claimed in claim 1, wherein the checking period in which the auxiliary checking process is carried out, during which the sensor data and parameter settings that are necessary for the operation of the driving safety or driver assistance system are checked for the plausibility thereof and in which the auxiliary process for the auxiliary mode of the driving safety or driver assistance system is used, is the period of time from the start of travel until the successful completion of all checking activities and plausibility check activities.

4. The method as claimed in claim 1, wherein the checking period in which the checking process is carried out, during which the sensor data and parameter settings that are necessary for the operation of the driving safety or driver assistance system are checked for the plausibility thereof and in which the auxiliary process for the auxiliary mode of the driving safety or driver assistance system is used, is a period of time in which the motor vehicle covers a driving distance of a certain minimum length.

5. The method as claimed in claim 4, wherein the checking period is a period of time in which the motor vehicle covers a driving distance of between 2 km and 15 km.

6. A method for operating an autonomous driving safety system or driver assistance system of a motor vehicle, the method comprising:
    continuously recording data using the autonomous driving safety or driver assistance system, wherein the data include at least one of vehicle-related data and vehicle surroundings-related data,
    continuously repeatedly deciding, based on the recorded data, whether a driving safety or driver assistance system process is to be autonomously initiated or carried out, and
    carrying out a checking process, during which sensor data and parameter settings that are necessary for the operation of the driving safety or driver assistance system are checked for the plausibility thereof,
    wherein the checking process is carried out immediately following a start of travel of the motor vehicle,
    wherein in a period of time between the start of travel of the motor vehicle and a start of operation of the driving safety or driver assistance system, an auxiliary process for an immediate and safe auxiliary mode of the driving safety or driver assistance system having reduced functional scope is used,
    wherein the driving safety or driver assistance system acts at least as an emergency brake system, and
    wherein at least one of drive-related data of the motor vehicle, route-related data, traffic-related data, environment-related data, and data for assessing the driving activities of the driver of the motor vehicle are continuously recorded,
    wherein at least one of a position, a speed, and an acceleration of at least one motor vehicle ahead and/or the position of at least one stationary obstacle are recorded continuously,
    wherein based on the recorded data a decision is made continuously and repeatedly regarding whether an emergency braking process preventing a collision of the motor vehicle with at least one vehicle ahead and/or a stationary obstacle ahead, or at least reducing the consequences of such a collision, is to be autonomously initiated or carried out,
    wherein the auxiliary process for the auxiliary mode of the driving safety or driver assistance system uses previously determined assumptions and/or immediately available data about the operating state of the motor vehicle, about the geometry of the current route, about a current range of driving speeds of the motor vehicle, about the current traffic situation, and about the current driving activities of the driver,
    wherein during the course of the auxiliary process, the sensor data and parameter settings that are necessary for the operation of the auxiliary process are checked for the plausibility thereof, and
    wherein during the course of the auxiliary process a start scenario with the initial sensor data and initial parameter settings and with non-reduced functional scope is generated from plausible sensor data and parameter settings for the start of the operation of the driving safety or driver assistance system.

7. The method as claimed in claim 6, wherein the previously determined data and parameters used during the operation of the auxiliary process are successively replaced and/or supplemented by determined data and parameters that have been checked for the plausibility thereof.

8. A method for operating an autonomous driving safety system or driver assistance system of a motor vehicle, the method comprising:
    continuously recording data using the autonomous driving safety or driver assistance system, wherein the data include at least one of vehicle-related data and vehicle surroundings-related data, continuously repeatedly deciding, based on the recorded data, whether a driving safety or driver assistance system process is to be autonomously initiated or carried out, and carrying out a checking process, during which sensor data and parameter settings that are necessary for the operation of the driving safety or driver assistance system are checked for the plausibility thereof, wherein the checking process is carried out immediately following a start of travel of the motor vehicle, wherein in a period of time between the start of travel of the motor vehicle and a start of operation of the driving safety or driver assistance system, an auxiliary process for an immediate and safe auxiliary mode of the driving safety or driver assistance system having reduced functional scope is used, wherein an at least approximately turn-free route is assumed as a first assumption for the auxiliary process for the auxiliary mode of the driving safety or driver assistance system.

9. The method as claimed in claim 8, wherein a turn radius of |rcurve|>1000 m is assumed for the route for the auxiliary process.

10. The method as claimed in claim 8, wherein a limited range of driving speeds is assumed as a second assumption for the auxiliary process for the auxiliary mode of the driving safety or driver assistance system.

11. The method as claimed in claim 10, wherein a range of driving speeds of 60 km/h<vvehicle<90 km/h is assumed for the auxiliary process.

12. The method as claimed in claim 10, wherein as a third assumption for the auxiliary process for the auxiliary mode of the driving safety or driver assistance system, it is assumed that a vehicle ahead is moving relative to the subject vehicle with a limited speed in the lateral direction relative to the primary direction of travel of the subject motor vehicle.

13. The method as claimed in claim 12, wherein a relative lateral speed of a detected motor vehicle ahead of |vy|<0.5 m/s is assumed for the auxiliary process.

14. The method as claimed in claim 12, wherein as a fourth assumption for the auxiliary process for the auxiliary mode of the driving safety or driver assistance system, it is assumed that a detected object is disposed in the surroundings of the vehicle for a minimum period of time.

15. The method as claimed in claim 14, wherein a minimum period of time in which a detected object is disposed in the surroundings of the vehicle of tobj>3 s is assumed for the auxiliary process.

16. The method as claimed in claim 14, wherein as a fifth assumption for the auxiliary process for the auxiliary mode of the driving safety or driver assistance system, stopped vehicles are assumed to be stationary obstacles.

* * * * *